(12) United States Patent
Huang

(10) Patent No.: US 8,963,878 B2
(45) Date of Patent: Feb. 24, 2015

(54) TOUCH CONTROL MODULE AND ELECTRONIC DEVICE THEREOF

(75) Inventor: Yao-Han Huang, Taipei (TW)

(73) Assignee: Wistron Corporation, New Taipei (TW)

( * ) Notice: Subject to any disclaimer, the term of this patent is extended or adjusted under 35 U.S.C. 154(b) by 142 days.

(21) Appl. No.: 13/545,722

(22) Filed: Jul. 10, 2012

(65) Prior Publication Data

US 2013/0088458 A1    Apr. 11, 2013

(30) Foreign Application Priority Data

Oct. 11, 2011   (TW) .............................. 100136769 A

(51) Int. Cl.
| | |
|---|---|
| G06F 3/045 | (2006.01) |
| G06F 3/041 | (2006.01) |
| G06F 3/02 | (2006.01) |
| G09G 5/00 | (2006.01) |
| G06F 3/044 | (2006.01) |
| G06F 1/16 | (2006.01) |
| G06F 3/0354 | (2013.01) |

(52) U.S. Cl.
CPC ................ *G06F 3/044* (2013.01); *G06F 1/169* (2013.01); *G06F 1/1692* (2013.01); *G06F 3/03547* (2013.01); *G06F 2203/0339* (2013.01)
USPC ....................................................... 345/174

(58) Field of Classification Search
None
See application file for complete search history.

(56) References Cited

U.S. PATENT DOCUMENTS

| | | | |
|---|---|---|---|
| 2004/0019724 A1* | 1/2004 | Singleton et al. ............. | 710/303 |
| 2011/0079449 A1* | 4/2011 | Radivojevic ............... | 178/18.03 |
| 2011/0141052 A1* | 6/2011 | Bernstein et al. ............. | 345/174 |

* cited by examiner

*Primary Examiner* — Amr Awad
*Assistant Examiner* — Andre Matthews
(74) *Attorney, Agent, or Firm* — Muncy, Geissler, Olds & Lowe, P.C.

(57) ABSTRACT

A touch control module and an electronic device thereof are disclosed. The touch control module includes a panel, a plurality of electrodes, and a control module. The panel is a flexible transparent and material and includes a first surface and a second surface. The plurality of electrodes is disposed on the second surface. When the first surface is touched, the plurality of electrodes is used for sensing at least one capacitance signal individually. The control module electronically connects to the plurality of electrode and is used for receiving at least one capacitance signal to control the electronic device.

18 Claims, 6 Drawing Sheets

TOUCH CONTROL MODULE AND ELECTRONIC DEVICE THEREOF

BACKGROUND OF THE INVENTION

1. Field of the Invention

Present invention relates to a touch control module and an electronic device with the touch control module thereof; more particularly, the present invention relates to a touch control module and an electronic device with the touch control module thereof that uses a transparent and flexible material.

2. Description of the Related Art

With advancement of technology, various electronic products have made extensive presence in today's life. Touch control switches have also been widely used in many electronic products, wherein a capacitance switch module used for sensing a capacitance signal as its control signal is disclosed. Currently for esthetic or special shape designs, the electronic products have employed many transparent plastics as their designs for appearances. Meanwhile, there is demand to make the capacitance switch module transparent in their designs.

In the prior art, the capacitance switch module used brass in the sensor area on the printed circuit board before they were covered with a plastic panel. A User controls the capacitance switch module with pressing or touching the plastic panel. However, the printed circuit board in the prior art is not suitable for making the electronic product with a transparent appearance. Also, the fact that the printed circuit board is usually a hard board creates limitation in relation to the designs of the electronic product.

Therefore, there is a need to provide a new kind of touch control module and an electronic device with the touch control module, to solve the problem of the prior art.

SUMMARY OF THE INVENTION

It is an object of the present invention to provide a touch control module that employs flexible transparent material.

It is another object of the present invention to provide an electronic device with the abovementioned touch control module.

In order to achieve the purpose stated above, the touch control module of the present invention is used in an electronic device. The touch control module includes a panel, a plurality of electrodes, and a control module. The panel, which is made of a transparent and flexible material, includes a first surface and a second surface. The plurality of electrodes is disposed on the second surface. When the first surface is touched, the plurality of electrodes is used for sensing at least one capacitance signal individually. The control module electronically connects to the plurality of electrodes, and is used for receiving at least one capacitance signal to control the electronic device.

The electric device of the present invention has a touch control function. The electric device includes a controlled module and a touch control module. The touch control module electronically connects to the controlled module. The touch control module includes a panel, a plurality of electrodes, and a control module. The panel is made of a transparent and flexible material and includes a first surface and a second surface. The plurality of electrodes is disposed on the second surface. When the first surfaced is touched, the plurality of electrodes is used for sensing at least one capacitance signal individually. The control module electronically connects to the plurality of electrodes and is used for receiving at least one capacitance signal to control the controlled module.

DETAILED DESCRIPTION OF THE PREFERRED EMBODIMENTS

These and other objects and advantages of the present invention will become apparent from the following description of the accompanying drawings, which disclose several embodiments of the present invention. It is to be understood that the drawings are to be used for purposes of illustration only, and not as a definition of the invention.

Figure 1:
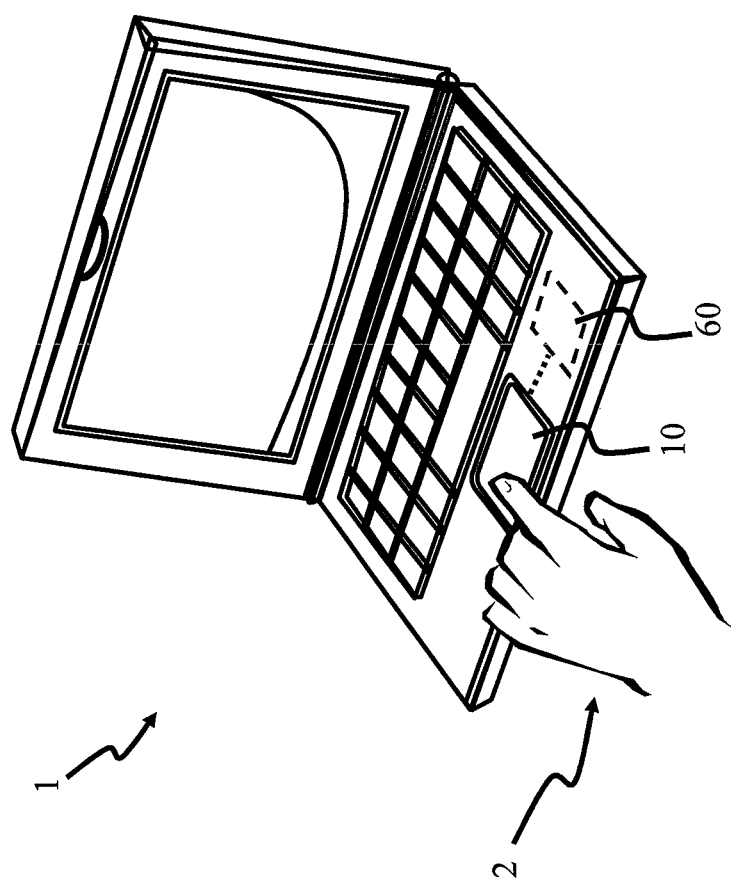
FIG. 1 is the illustration of the electronic device and the touch control module in present invention.

First, please refer to FIG. 1 which is the illustration of the electronic device and touch control module.

Figure 2A:
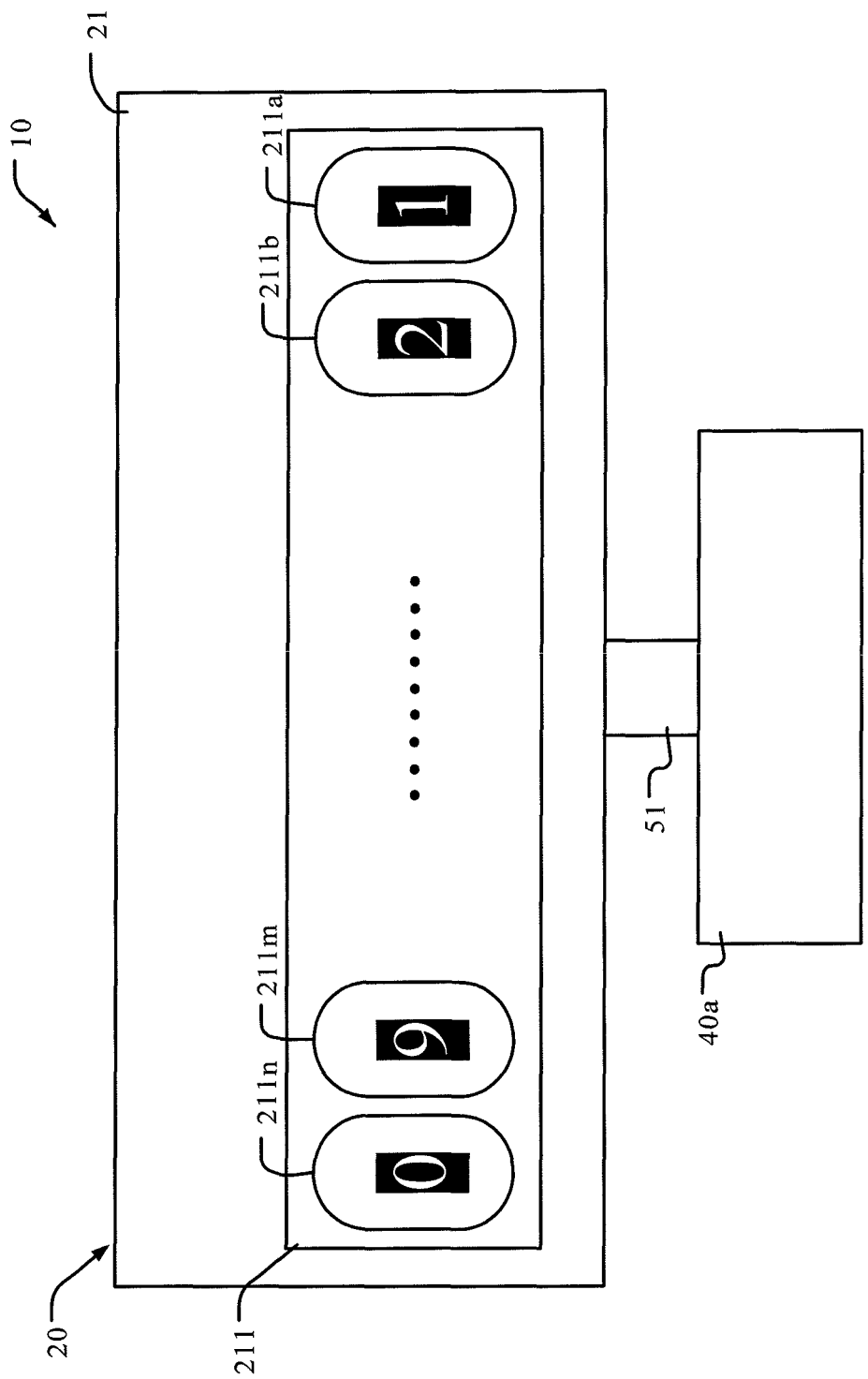
FIG. 2A is the illustration of the first surface on the panel of the touch control module in present invention.

In one of the embodiments of the present invention, the electronic device 1 can be a laptop computer, or a desktop computer, or a mobile device like a cell phone. However, the present invention is not limited to the abovementioned devices. The electronic device 1 comprises a touch control module 10 and a controlled module 60. As shown in FIG. 1, the touch control module 10 can be disposed on the electronic device 1 to enable the control by a contact object 2. The contact object 2 can be a finger or a touch control pen. As shown in FIG. 1 a finger is used for clarification, but present invention is not limited to the finger. In this embodiment, the touch control module 10 is a capacitance touch control module with a transparent and flexible panel 20 as shown in FIG. 2A. As a result, the electronic device 1 can dispose an illuminating module, like LED (not shown in the figure) under the touch control module 10. The light source of the illuminating module can show through the transparent panel 20. Also, the touch control module 10 can be installed on the side of the electronic device 1, or applied in other specific ways base on the feature of flexible. Present invention does not limit itself to the position illustrated in FIG. 1.

Furthermore, the touch control module 10 electronically connects to the controlled module 60. The controlled module 60 is a module constructed with a software program or a hardware in the electronic device 1 and capable of executing a signal received from the touch control module 10. The present invention is not limit to the classification of the controlled module 60. There will be detailed explanations on the methods of the controlled module 60 later, therefore it is not described here.

Figure 2B:
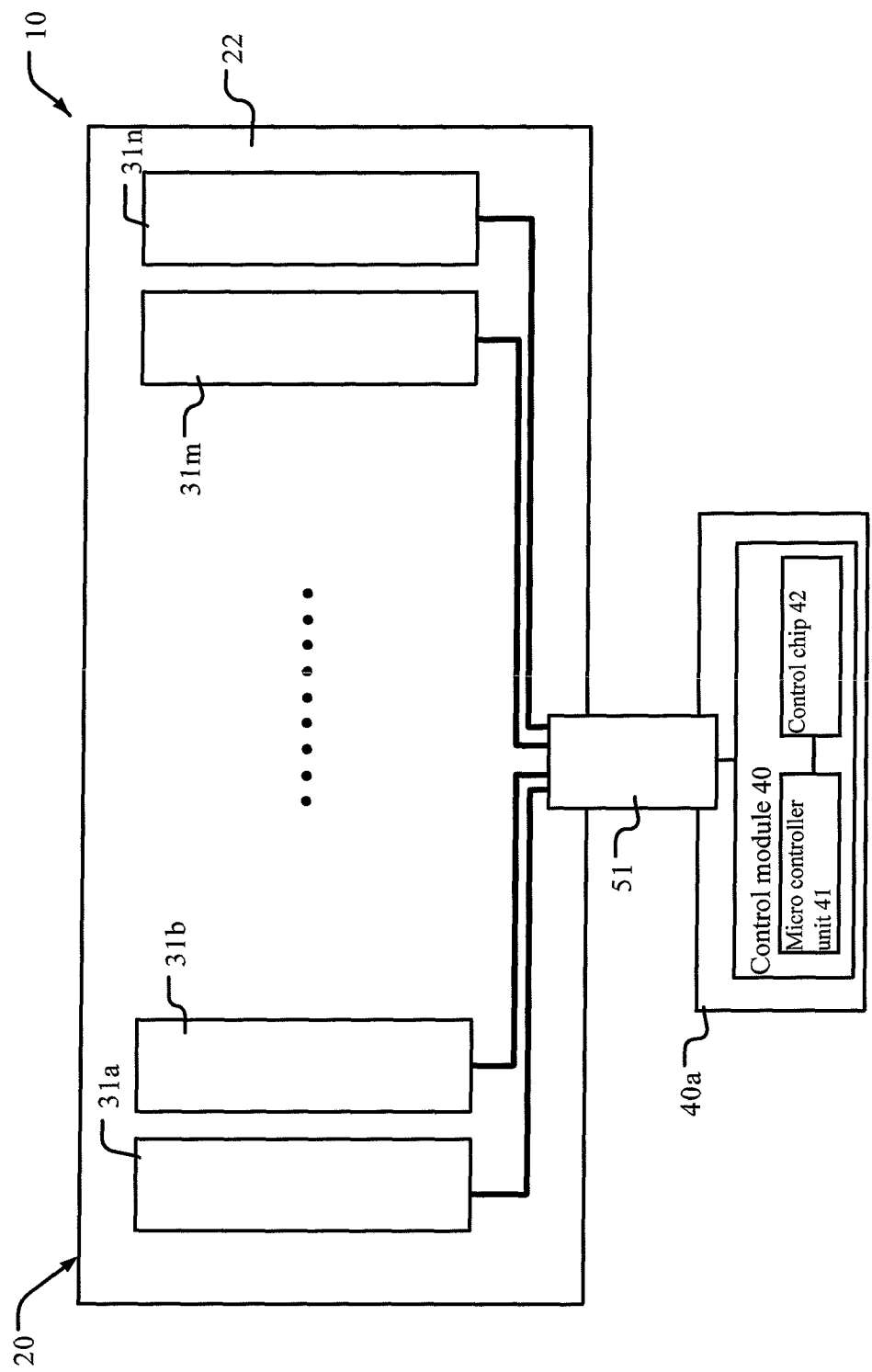
FIG. 2B is the illustration of the second surface on the panel of the touch control module in present invention.

Please refer to FIG. 2A-2B, the illustration of the touch control module in present invention, regarding the detailed construction of the touch control module 10. FIG. 2A is the illustration of the first surface of the panel in the touch control module in the present invention. FIG. 2B is the second surface of the panel in the touch control module in the present invention.

In one of the embodiments of the present invention, the control module 10 includes a panel 20, a plurality of electrodes, a control module 40, and a flexible printed circuit 51. The panel 20 is made with a transparent and flexible material, like Polyethylene terephthalate (PET) plastic, polycorbonate (PC) plastic, polymethylmethacrylate (PMMC) plastic, or polystyrene (PS) plastic, but the present invention is not limited to abovementioned materials. The panel 20 includes a first surface 21 and a second surface 22. The first surface 21 is capable of showing a user operating interface 211 to enable the touch control by the user. According to various needs, the user operating interface 211 in order to have a plurality of operating areas, for example, the operating area 211a, 211b, 211m, to 211n as shown in FIG. 1. The operating area 211a, 211b, 211m to the operating 211n can all show different figures, characters, symbols, or patterns, but present invention is not limited to the patterns as shown in FIG. 1. What's worth noting is that the user operating interface 211 can be used in electroplated, coated, or adhesion to develop on the first surface 21 of the panel 20. The Present invention is not limited to the way of showing the user operating interface 211.

The plurality of electrodes can be made with the conductive floor of the Indium Tin Oxide, ITO. The plurality of electrodes is disposed on the second surface 22 of the panel 20. The way of implementing it is to place the conductive floor on the second surface 22 with the approach of coating, and then go through the process of etching with laser etching according to the design pattern. The design pattern is consistent with the layout of the operating area for the user operating interface 211. The resistance value of individual electrode is set at 400-3000Ω/Square, but the present invention is not limited to it. Thus, the electrode 31a, 31b, 31m to 31n can be constructed as shown in FIG. 2B.

The following formula shows the way to calculate C, the static capacitance value when there is a layer of insulator between two pieces of conductors:

$$C = \epsilon_0 * \epsilon_S * S/d$$

In the above, $\epsilon_0$ is the dielectric constant in the vacuum (8.8543*10^-12 F/m). $\epsilon_S$ is the dielectric constant of the insulator. S is the area measurement of the conductor. "d" is the distance between two conductors. Since this equation is familiar to and widely applied by the related technical people in the area with which this invention affiliates, there is no need to describe the principle of it.

Figures 3A, 3B:
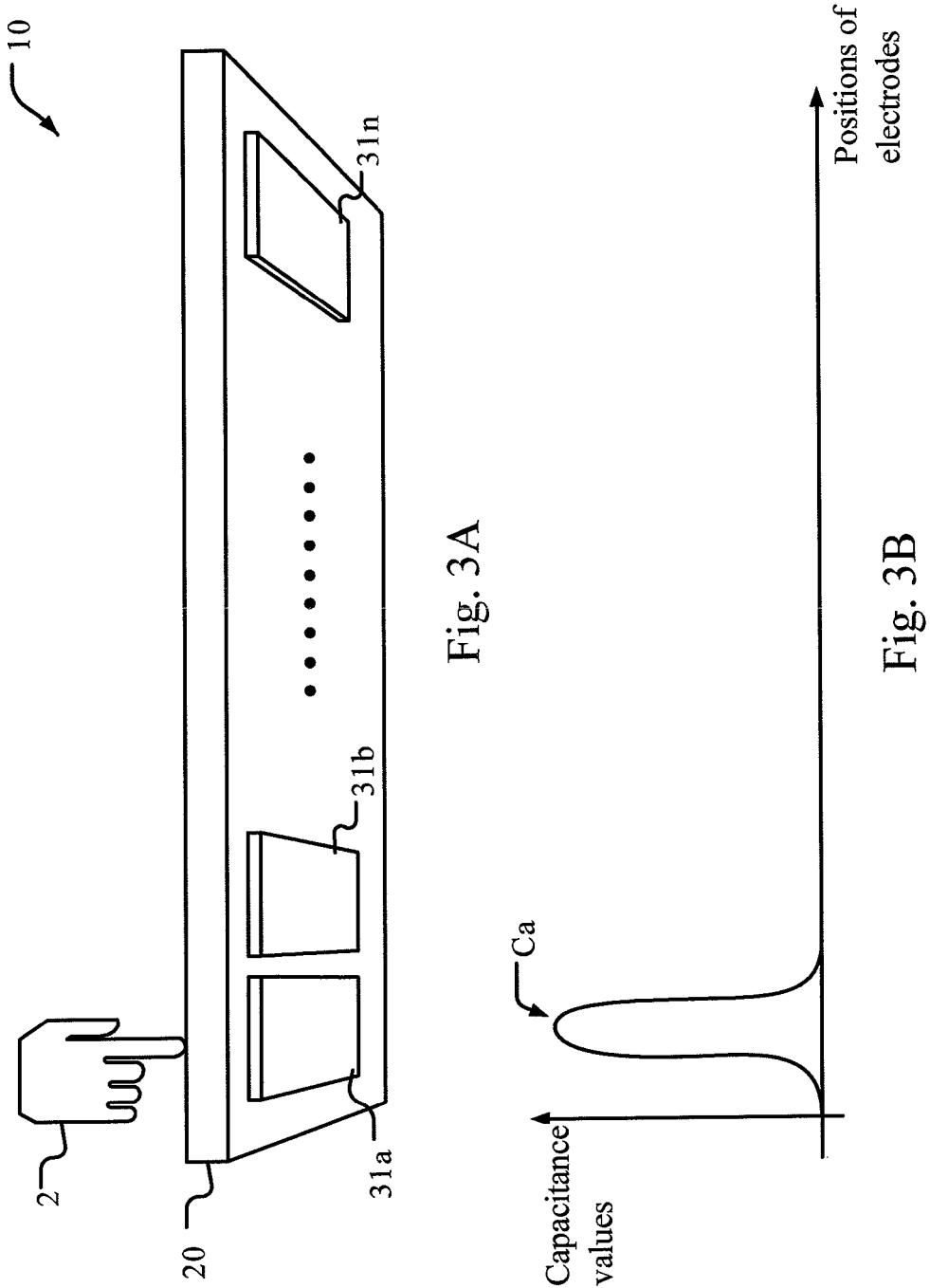
FIG. 3A is the illustration of the first embodiment using a contact object to operate the touch control module in present invention.
FIG. 3B is based on FIG. 3A, and is the diagram of the capacitance values and the positions of the electrodes in the first embodiment in present invention.

When a finger or other contact object as the contact object 2 (as shown in FIG. 3A) touches the first surface 21 of the panel 20, there will be coupling of capacitances between the first surface 21 and one of the electrodes of the second surface 22 owing to the fact that fingers carry a small finite electrostatic charge. Thus, the capacitance signal can be detected. The capacitance value may be determined by the application of the following equation: Electric charge value Q=Capacitance value C*Voltage value V Since the electric charge value of each electrode increases at a fixed rate, the electrode with greater capacitance value has lower voltage after being charged. Therefore by measuring the voltage value of each electrode, the capacitance value of each electrode can be determined. Since this equation is familiar to and widely applied by the related technical people in the area with which this invention affiliates, there is no need to describe the principle of it.

In the present embodiment, the positions of the electrode 31a, 31b, 31m to 31n are consistent with the layout of the operating areas 211a, 211b, 211m, to 211n. In one of the embodiments of the present invention, the operating area 211a corresponds with the electrode 31a. The operating area 211b corresponds to the electrode 31b. The operating area 211m corresponds to the electrode. 31m. And the last one, the operating area 211n corresponds to the electrode 31n. AS shown in FIG. 2B, the plurality of electrodes 31a, 31b, 31m to 31n are arranged side by side, but present invention is not limited to this particular way of arrangement. Thus, when a finger or other contact objects touch the operating areas 211a, 211b, 211m, or 211n, the corresponding the electrodes 31a, 31b, 31m or 31n will sense capacitance signals individually.

The control module 40 is disposed on the circuit board 40a and electronically connected with the plurality of electrodes of the second surface 22 via flexible printed circuit (FPC) 51, so that it can receive at least one capacitance signal. The control module 40 comprises a micro controller unit (MCU) 41 and a control chip 42. The micro controller unit 41 is electronically connected with the plurality of electrodes, so that it can gauge the specific signals and the sensing positions according to the capacitance signals. The specific signal can be a single-spot capacitance signal, a multi-spot capacitance signal, or a time differential capacitance signal. Also, because the micro controller unit 41 can receive various capacitance signals transmitted from different electrodes via various foot positions, it is capable of gauging the sensing positions and the particular electrodes from which the capacitance signals are sent forth. The control chip 42 is electronically connected with the micro controller unit 41 to control the controlled module 60 in the electronic device 1 according to the specific signals and sensing positions gauged by the micro controller unit 41.

Then please refer to FIG. 3A to FIG. 3B regarding the related illustration of the first embodiment for the touch control module in present invention. FIG. 3A is the illustration for the first embodiment of the operation of touch control module using contact objects in present invention. FIG. 3B is based on FIG. 3A and is the diagram of capacitance values and the positions of electrodes in the first embodiment in present invention.

In the first embodiment of the present invention, a single contact object 2 touches the user operating interface 211 of the first surface 21. If the contact object 2 touches the operating area 211a, its corresponding electrode 31a senses the capacitance signal Ca. The capacitance signal Ca will be directly transmitted to the micro controller unit 41. Because the micro controller unit 41 has only received the capacitance signal Ca, the micro controller unit 41 determines that the capacitance signal Ca is a single capacitance signal produced by the electrode 31a. Then the control chip 42 controls the controlled module 60 to execute the command from the operating area 211a.

Figure 4A:
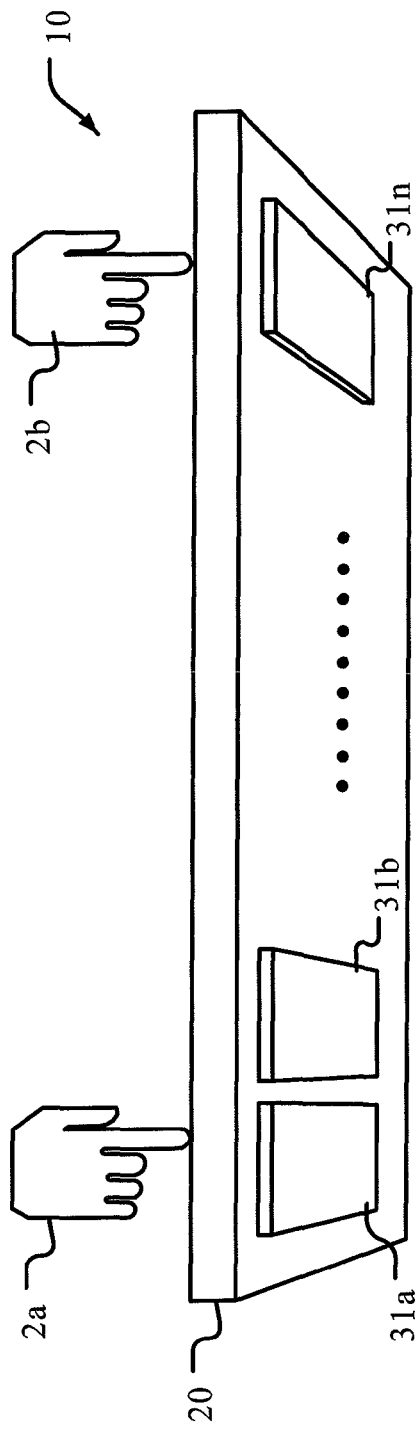
FIG. 4A is the illustration of the second embodiment using contact objects to operate the touch control module in present invention.
Figure 4B:
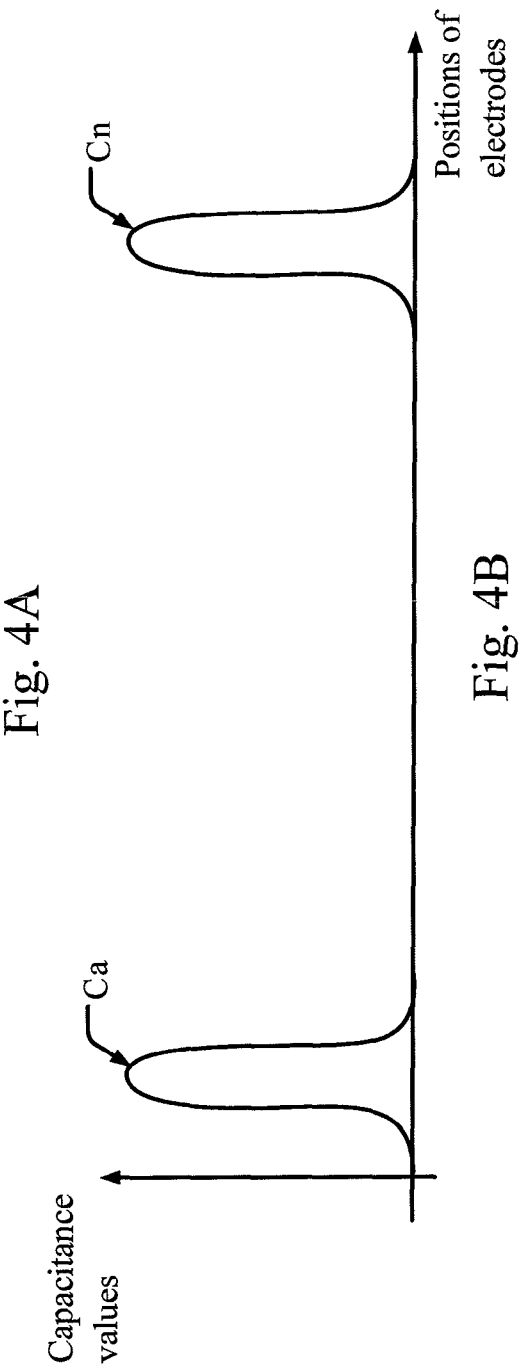
FIG. 4B is based on FIG. 4A, and is the diagram of the capacitance values and the positions of the electrodes in the second embodiment in present invention.

Following the above, please refer to FIG. 4A to FIG. 4B, which are the illustration of the second embodiment of the touch control module in present invention. FIG. 4A is the illustration of present invention's second embodiment, in which the contact objects are used to operate the touch control module. FIG. 4B is based on FIG. 4A, and is the diagram of capacitance values and the positions of electrodes in present invention's second embodiment.

When the contact object 2a and the contact object 2b simultaneously touch the user operating interface 211 of the first surface 21, the electrode 31a and the electrode 31n, which correspond to the operating area 211a and the operating area 211n, produce simultaneously a capacitance signal Ca and Cn. The capacitance signal Ca and the capacitance signal Cn simultaneously get transmitted to the micro controller unit 41. When the micro controller unit 41 receives the two capacitance signals, it determines that they are the multi-spot capacitance signals Ca and Cn, which are produced separately by the electrode 31a and the electrode 31n. The control chip 42 then controls the controlled module 60, and simultaneously executes the commands from the operating area 211a and the operating area 211n.

Figure 5A:
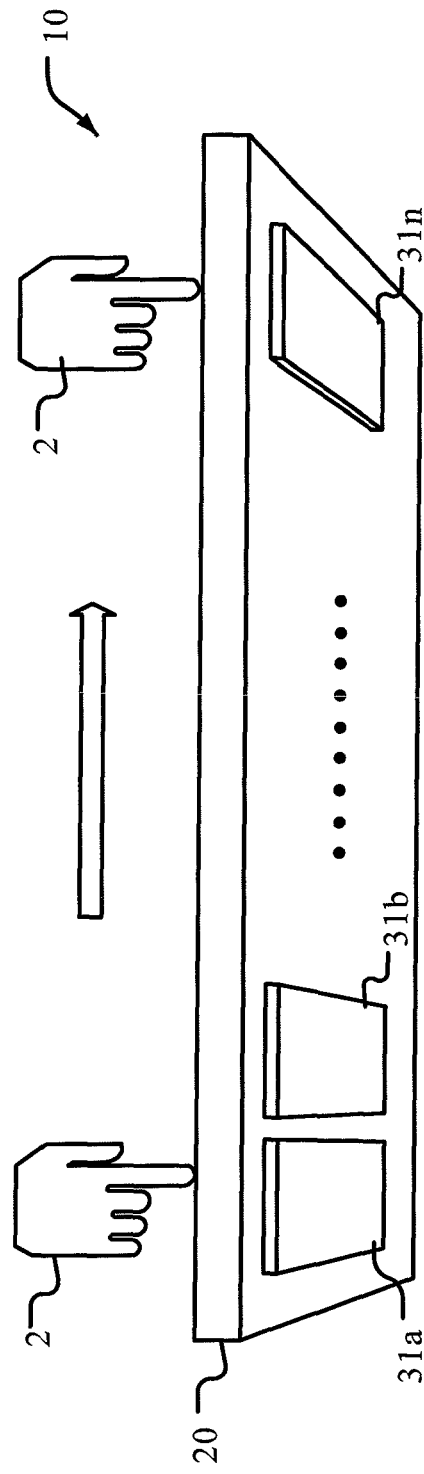
FIG. 5A is the illustration of the third embodiment using contact objects to operate the touch control module in present invention.
Figure 5B:
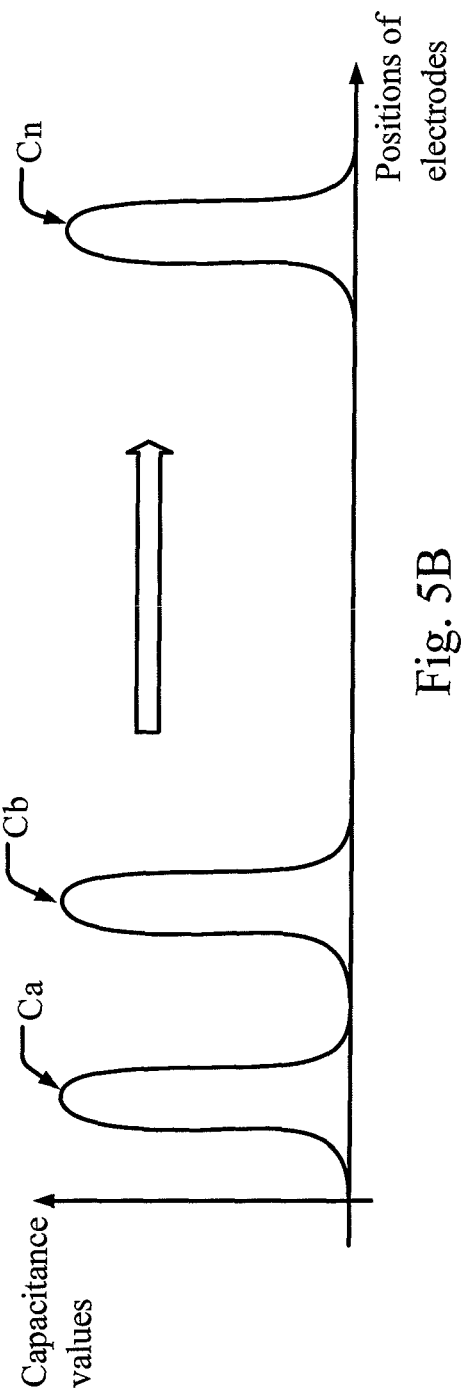
FIG. 5B is based on FIG. 5A, and is the diagram of the capacitance values and the positions of the electrodes in the third embodiment in present invention.

At last, please also refer to FIG. 5A to FIG. 5B, the illustration of present invention's third embodiment of the touch control module. FIG. 5A is the illustration of present invention's third embodiment, using contact objects to operate touch control module. FIG. 5B is based on FIG. 5A, and is the diagram of capacitance values and the positions of electrodes in present invention's third method of implementation.

In the third embodiment of the present invention, the contact object 2 glides from the operating area 211a of the user operating interface 211 to the operating area 211n. Under such circumstance, the electrodes 31a to 31n, which correspond to the operating areas 211a to 211n, sense sequentially capacitance signals Ca, Cb to Cn, and then sequentially get transmitted to the micro controller unit 41. Thus, the micro controller unit 41 can determine that these are the time differential capacitance signals from the electrodes 31a, 31b, to 31n. The control chip 42 then controls the controlled module 60 to execute the commands from the operating area 211a gliding to the operating area 211n.

In the present invention, aside from the embodiments addressed above, the touch control module 10 has other methods for control. For example, the capacitance signals from the plurality of electrodes in the touch control module 10 can comprise a first signal, a second signal, or a third signal. The first signal represents a control signal from a left button of a mouse, the second signal represents a control signal from a right button of the mouse, and the third signal represents a control signal from a scroll wheel of the mouse. With this, the user can operate the user operating interface 211 to replace the functions of the mouse to control the controlled module 60.

The touch control module 10 in the present invention can be used in the electronic device 1, which has a transparent appearance, and therefore increases the flexibility for the design of the appearance. Also, the touch control module 10 provides single-spot or multi-spot touch control modes, and is applicable in the control methods for various uses.

It is noted that the above-mentioned embodiments are only for illustration. It is intended that the present invention cover modifications and variations of present invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A touch control module used in an electronic device, comprising:

a panel which is made of a transparent and flexible material comprising a first surface and a second surface, wherein a plurality of figures, characters, symbols, or patterns are shown on the first surface;

a plurality of electrodes disposed on the second surface and used for sensing at least one capacitance signal individually when the first surface is touched, wherein a number of the plurality of figures, the characters, the symbols, or the patterns is equal to a number of the plurality of electrodes; and a control module electronically connected with the plurality of electrodes for receiving the at least one capacitance signal to control the electronic device; wherein the touch control module has ten electrodes disposed on the second surface, wherein figures "0" to "9" are shown on the ten electrodes separately.

2. The touch control module as claimed in claim 1, wherein the control module comprises:

a micro controller unit electronically connected with the plurality of electrodes for receiving the at least one capacitance signal to determine a specific signal and a sensing position; and a control chip electronically connected with the micro controller unit for controlling the electronic device according to the specific signal and the sensing position.

3. The touch control module as claimed in claim 2, wherein the specific signal is a single-spot capacitance signal, a multi-spot capacitance signal, or a time differential capacitance signal.

4. The touch control module as claimed in claim 1, wherein the control module is disposed on a circuit board.

5. The touch control module as claimed in claim 4, wherein the control module is electronically connected with the plurality of electrodes via a flexible printed circuit.

6. The touch control module as claimed in claim 1, wherein the first surface displays a user operating interface.

7. The touch control module as claimed in claim 6, wherein the user operating interface comprises a plurality of operating areas, and the positions of the plurality of electrodes correspond to the positions of the plurality of operating areas.

8. The touch control module as claimed in claim 7, wherein the plurality of electrodes are parallel to each other.

9. The touch control module as claimed in claim 1, wherein the at least one capacitance signal further comprises a first signal, a second signal, or a third signal; the first signal is a control signal from a left button of a mouse; the second signal is a control signal from a right button of the mouse; and the third signal is a control signal from a scroll wheel of the mouse.

10. An electronic device with a touch control function comprising:

a controlled module; and a touch control module electronically connected with the controlled module, comprising:

a panel which is made of a transparent and flexible material comprising a first surface and a second surface, wherein a plurality of figures, characters, symbols, or patterns are shown on the first surface;

a plurality of electrodes disposed on the second surface and used for sensing at least one capacitance signal individually when the first surface is touched, wherein a number of the plurality of figures, the characters, the symbols, or the patterns is equal to a number of the plurality of electrodes; and a control module electronically connected with the plurality of electrodes for receiving at least one capacitance signal to control the controlled module; wherein the touch control module has ten electrodes disposed on the second surface, wherein figures "0" to "9" are shown on the ten electrodes separately.

11. The electronic device as claimed in claim 10, wherein the control module comprises:
    a micro controller unit electronically connected with the plurality of electrodes for receiving at least one capacitance signal to determine a specific signal and a sensing position; and
    a control chip electronically connected with the micro controller unit for controlling the controlled module according to the specific signal and the sensing position.

12. The electronic device as claimed in claim 11, wherein the specific signal is a single-spot capacitance signal, a multi-spot capacitance signal, or a time differential capacitance signal.

13. The electronic device as claimed in claim 10, wherein the control module is disposed on a circuit board.

14. The electronic device as claimed in claim 13, wherein the control module is electronically connected with the plurality of electrodes via a flexible printed circuit.

15. The electronic device as claimed in claim 10, wherein the first surface displays a user operating interface.

16. The electronic device as claimed in claim 15, wherein the user operating interface comprises a plurality of operating areas, and the positions of the plurality of electrodes correspond to the positions of the plurality of operating areas.

17. The electronic device as claimed in claim 16, wherein the plurality of electrodes are parallel to each other.

18. The electronic device as claimed in claim 10, wherein the at least one capacitance signal further comprises a first signal, a second signal or a third signal; the first signal is a control signal from a left button of a mouse; the second signal is a control signal from a right button of the mouse; the third signal is a control signal from a scroll wheel of the mouse.

* * * * *